UNITED STATES PATENT OFFICE.

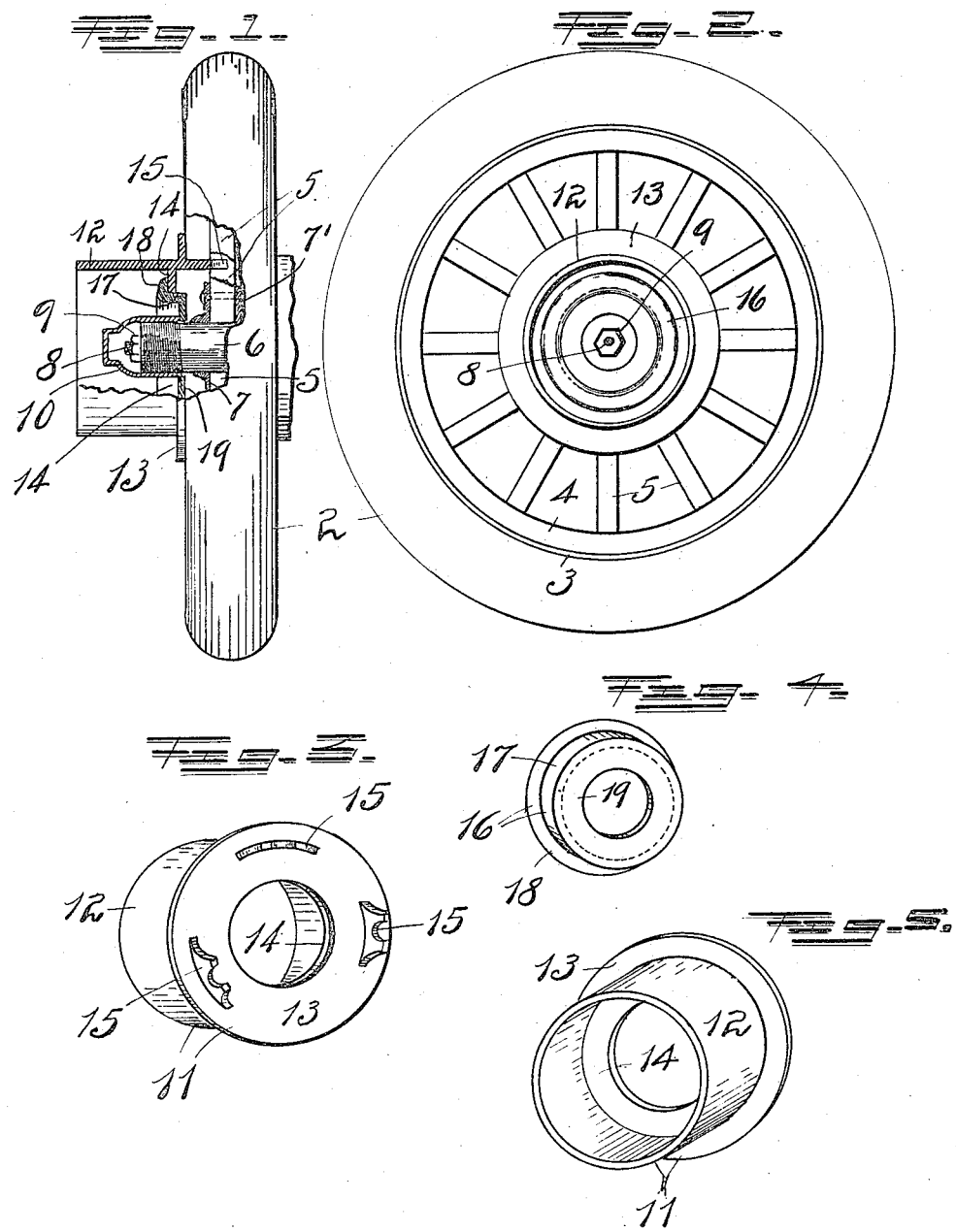

GEORGE G. BAYNE, OF BUSHNELL, ILLINOIS.

PULLEY ATTACHMENT FOR AUTOMOBILES.

1,262,003.    Specification of Letters Patent.    Patented Apr. 9, 1918.

Application filed October 27, 1917. Serial No. 198,839.

*To all whom it may concern:*

Be it known that I, GEORGE G. BAYNE, a citizen of the United States, and a resident of Bushnell, in the county of McDonough and State of Illinois, have invented a new and useful Pulley Attachment for Automobiles, of which the following is a specification.

The invention relates to pulleys and means for securing them to a drive-wheel of an automobile, whereby the motor of the vehicle imparts motion to the pulley in order to operate other machinery, and the invention consists, substantially, in the improvements herein described.

The principal object of the invention is to provide the usual pulley with a co-acting element whereby the former may be fitted and centered with great precision onto the hub of the vehicle-wheel by which it is driven.

A further object is to generally simplify and improve the construction and to increase the capacity, utility and efficiency of devices of this nature.

In the accompanying drawing, which illustrates my improvements as embodied in the best manner now known to me:

Figure 1 is a rear elevation, partly in section and partly broken away;

Fig. 2, a side elevation of a wheel to which my improvements have been applied;

Fig. 3, a perspective of the pulley proper, seen from its inner end;

Fig. 4, a perspective of one of the adapters;

Fig. 5, a perspective of the pulley proper, seen from its outer end.

Considering the drawings in detail, 2 designates the casing, 3 the rim, 4 the felly, 5 the spokes, 6 the hub, 7, 7' the spoke-tying disks, 8 the spindle, 9 the securing-nut, and 10 the hub-cap of a well-known type of automobile wheel.

11 designates a pulley comprising a drum 12, belt-flange 13, interiorly arranged pressure-flange 14, and spoke-stirrups 15.

16 indicates a bearing-ring or adapter comprising an annulus 17 having an outwardly directed peripheral flange 18 at its outer and an inwardly directed flange 19 at its inner end.

To attach the device to a wheel the hub-cap 10 is to be unthreaded from the hub 6. The pulley 11 is then to be positioned as shown in Fig. 1, with each stirrup 15 striding one of the spokes 5 and its flange 13 spaced some little distance therefrom in order to prevent the belt (not shown) from chafing the tire or casing 2. Incidentally it may be mentioned that practically all wood-spoke automobile-wheels are now constructed with twelve spokes, and that the three stirrups shown in Fig. 3 will fit nicely upon wheels of different sizes. When the pulley has been positioned as above described the adapter is positioned as shown in Fig. 1, with its flange 18 bearing against the flange 14 of the pulley. The hub-cap 10 is now to be replaced upon the hub 6, and its inner edge will bear strongly against the flange 19 of the adapter, forcing the latter inward and thereby causing its flange 17 to force the pulley-flange 19 and pulley in the same direction, thus drawing the stirrups 15 tightly upon the spokes 5 and locking the pulley on the wheel.

Inasmuch as the hubs of different makes of cars differ somewhat in circumference the openings in the adapters or bearing-rings are made accordingly, *i. e.*, while the adapters are made with various sized central openings 20 whereby to fit snugly upon the hubs of different sizes, the adapters *per se* are preferably all of the same size and general construction.

While the exact construction of the preferred form of my improvement has been herein described I do not intend, by describing the details thereof, to be understood as limiting myself in any manner thereto, the scope of the invention being pointed out in the appended claims.

Having thus described my invention I claim as new the following, to-wit:

1. The combination with a wheel including spokes, a hub, and a hub-cap, of a pulley having projections to bear upon the wheel-spokes, and means actuated by the hub-cap for locking the pulley on the wheel.

2. The combination with a wheel including a hub-cap and a hub, of a pulley, and means actuated by said cap for locking the pulley upon the wheel.

3. The combination with a wheel including spokes, a hub, and a hub-cap, of a pulley disposed in axial alinement with said hub, and means actuated by the hub-cap for holding the pulley on the wheel.

4. The combination with a wheel including a hub-cap and a hub, of a pulley disposed in axial alinement with said hub, and a bearing-ring for holding said pulley in engagement with the wheel, said hub-cap holding the bearing ring against the pulley.

5. The combination with a wheel including a hub and a hub-cap, of a pulley in axial alinement with said hub, and a ring seated on said hub and bearing against the pulley, said cap bearing against said ring.

6. The combination with a wheel including a hub and a cap threaded thereon, of a pulley in axial alinement with the hub, and a ring seated on the hub and bearing against the pulley, said cap when threaded onto said hub holding the bearing ring in operative position.

7. The combination with a wheel including a hub and a cap therefor, of a pulley in axial alinement with the hub and having an interior flange, and an element adapted to bear on said flange and thereby force the pulley toward the wheel, said ring adapted to be held in operative position by said cap.

8. The combination with a wheel, of a pulley in axial alinement with the hub of the wheel and provided with an interior projection, and means bearing against said projection and holding the pulley in operative engagement with the wheel.

9. The combination with a wheel, of a pulley in axial alinement with the hub thereof and provided with an interior projection, means bearing against said projection and holding the pulley in operative engagement with the wheel, and means for forcing the last recited element into contact with the pulley.

10. In a device of the nature described, a pulley comprising a belt-drum having an interior projection and having spoke engaging projections, and a bearing-ring having a flange adapted to bear on said interior projection.

GEORGE G. BAYNE.

Copies of this patent may be obtained for five cents each, by addressing the "Commissioner of Patents, Washington, D. C."